United States Patent
Liu et al.

(10) Patent No.: US 11,603,747 B2
(45) Date of Patent: Mar. 14, 2023

(54) THREE-STAGE DEGASSING AND DEWATERING DEVICE

(71) Applicant: QINGDAO UNIVERSITY OF TECHNOLOGY, Qingdao (CN)

(72) Inventors: Xinfu Liu, Qingdao (CN); Qingping Li, Beijing (CN); Youqiang Wang, Qingdao (CN); Chunhua Liu, Qingdao (CN); Zhongxian Hao, Beijing (CN); Feng Liu, Qingdao (CN); Ji Chen, Xi'an (CN); Guanghai Yu, Dezhou (CN); Xiaoming Wu, Panjin (CN); Xiaolei Wang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 133 days.

(21) Appl. No.: 17/211,884

(22) Filed: Mar. 25, 2021

(65) Prior Publication Data

US 2022/0127946 A1 Apr. 28, 2022

(30) Foreign Application Priority Data

Oct. 22, 2020 (CN) .......................... 202011135729.1

(51) Int. Cl.
*B01D 17/06* (2006.01)
*E21B 43/34* (2006.01)
(Continued)

(52) U.S. Cl.
CPC .......... *E21B 43/34* (2013.01); *B01D 17/0217* (2013.01); *B01D 17/06* (2013.01); *B01D 19/0042* (2013.01)

(58) Field of Classification Search
CPC ...... B01D 17/06; B01D 19/0042; E21B 43/34
(Continued)

(56) References Cited

U.S. PATENT DOCUMENTS 1,468,193 A * 9/1923 Carter ..................... E21B 43/34
96/183
2,224,345 A * 12/1940 Heathman .......... B01D 19/0063
210/540

(Continued)

FOREIGN PATENT DOCUMENTS

| CN | 106637293 A | 6/2017 |
| CN | 106833728 A | 6/2017 |
| CN | 106938152 A | 7/2017 |

*Primary Examiner* — Christopher Upton

(57) ABSTRACT

A three-stage degassing and dewatering device includes a first-stage degasser, a second-stage degasser, an oil drainer, a rod electrode, a dewaterer, and a water drainer. The first-stage degasser implements a first-stage axial-flow type collision buffer degassing and dewatering operation, forming a first-stage crude oil after removing some of the gas and water in the gas-containing and water-containing crude oil. The second-stage degasser implements a second-stage elevated efficient degassing operation, forming a second-stage crude oil after removing the remaining gas in the first-stage crude oil. The rod electrode constructs a dynamic electric field with a high frequency and a high voltage, and implements a third-stage high-frequency and high-voltage rapid dewatering operation together with the dewaterer, forming a qualified crude oil after removing the remaining water in the crude oil emulsion.

10 Claims, 11 Drawing Sheets

(51) Int. Cl.
*B01D 17/02* (2006.01)
*B01D 19/00* (2006.01)

(58) Field of Classification Search
USPC .............. 210/188, 243, 519, 537, 539, 540,
210/748.01; 95/243, 253; 96/182, 183;
166/75.12
See application file for complete search history.

(56) References Cited

U.S. PATENT DOCUMENTS

| | | | | |
|---|---|---|---|---|
| 5,415,776 | A * | 5/1995 | Homan | E21B 21/063 |
| | | | | 210/519 |
| 5,865,992 | A * | 2/1999 | Edmondson | B01D 17/06 |
| | | | | 210/539 |
| 6,315,898 | B1 * | 11/2001 | Bull | B01D 17/06 |
| | | | | 210/243 |
| 6,537,458 | B1 * | 3/2003 | Polderman | B01D 19/0042 |
| | | | | 95/253 |
| 7,014,757 | B2 * | 3/2006 | Rhodes | E21B 43/34 |
| | | | | 96/182 |
| 7,163,624 | B2 * | 1/2007 | Nilsen | B01D 17/06 |
| | | | | 210/243 |
| 2013/0327646 | A1 * | 12/2013 | Sams | B01D 17/06 |
| | | | | 204/666 |
| 2017/0157536 | A1 * | 6/2017 | Mandewalkar | B01D 17/06 |
| 2020/0316617 | A1 * | 10/2020 | Gong | B01D 17/06 |

* cited by examiner

THREE-STAGE DEGASSING AND DEWATERING DEVICE

TECHNICAL FIELD

The present invention relates to a highly efficient separation device in the field of oil-gas field development and mining engineering, and relates to a three-stage degassing and dewatering device with a tube network and a rod electrode squirrel-cage formation with one or more T-shaped tubes combined in particular.

BACKGROUND ART

At present, onshore oil and gas field exploitation has entered into the middle and late stages. The incremental part of the crude oil yield in China mainly comes from offshore oils and gases. The produced fluid from the offshore oil and gas wells is commonly lifted by electric submersible pumps to a platform first, and subsequently three-phase separation of oil, gas and water is carried out. The degassing and dewatering devices used for offshore oil and gas exploitation need to have characteristics such as simple structure, small size, light weight and high separation efficiency, and are applicable to severe disturbance produced by various multiphase flow states and inhibiting segment plug, and have the abilities of processing a crude oil emulsion in a highly efficient manner at the same time.

The research results of the three-phase separation technology of oil, gas and water indicate that combined horizontal degassing and dewatering devices are most commonly applied, and the operating principles thereof are as follows: re-combining internal members that are good for three-phase separation of oil, gas and water in existing gravity sedimentation separators, the inlet members pre-separating the gas of the produced fluid, the rectifying members reducing fluctuation and disturbance of oil, coalescing parts mainly using coalescing fillers and allowing discrete phase oil droplets with small particle diameters to attach to the surfaces of the coalescing parts and gradually become large by using oil and water phases and different polishing functions on coalescing materials, thereby accelerating the process of dewatering the produced fluid. Meanwhile, internal members designed such as anti-vortex cover, defogger, and liquid dispenser combine various separation technologies organically, and structural optimization is carried out, thereby achieving the object of improving the three-phase performance of oil, gas and water. A dewatering solution of separating two processes, i.e. water particle coalescence and growth and gravity sedimentation, has been proposed in foreign countries, that is, compact crude oil dewatering technology. The corresponding representative products include InLine ElectroCoalescer from FMC Technologies, Compact Electrostatic Coalescer from Kvaerner Process Systems and the like. The technologies have the defects as follows: a compact dewatering tank body is generally horizontal, and water particles that are coalescent and enlarged in the electric field may be ruptured again due to the shearing action, thereby affecting the separation process and separation effect of the subsequent gravity sedimentation. In addition, quite fewer academies of science and research in China start to pay attention to efficient and compact three-phase technology of oil, gas and water in recent years, wherein the research on the compact degassing and dewatering device and technology is still under the trial stage.

SUMMARY OF THE INVENTION

For overcoming the defects and shortcomings of the horizontal crude oil degassing and dewatering treatment facilities for oil and gas field development and mining engineering, and improving the research states where the separation technology for degassing and dewatering compact crude oils is still under the trial stage in China, the object of the present invention is to provide a three-stage degassing and dewatering device with a tube network and a rod electrode squirrel-cage formation suitable for oil and gas field development and mining engineering. In the three-stage degassing and dewatering device, a three-stage degassing and dewatering technology with vertical, horizontal and elevated T-shaped tubes combined as well as a high-frequency and high-voltage dynamic electric field dewatering technology with a squirrel-cage formation constructed by rod electrodes are adopted to implement a first-stage axial-flow type collision buffer degassing and dewatering operation, a second-stage elevated efficient degassing operation and a third-stage high-frequency and high-voltage rapid dewatering operation in turn, have characteristics such as highly efficient three-phase separation of oil, gas and water, low water content and low gas content in oil, and low oil content in water are possessed, and effectively solve the problem of efficiently separating gas-containing crude oil from water-containing crude oil.

The technical solution used for solving the technical problem in the present invention is to develop a three-stage degassing and dewatering device with a tube network and a rod electrode squirrel-cage formation, mainly consisting of a first-stage degasser, a second-stage degasser, a dewaterer, a rod electrode, an oil drainer and a water drainer. The materials for the body parts of the first-stage degasser, the second-stage degasser and the dewaterer are super two-way stainless steels. The first-stage degasser and the second-stage degasser are connected as one by means of an upper fluid bleeding tube and a lower fluid bleeding tube as well as an upper fluid feeding tube and a lower fluid feeding tube, and present a H-like shape as a whole. The second-stage degasser is connected with the dewaterer by means of a flow mixing tube, and presents a Y-like shape as a whole. The oil drainer and the water drainer are fixed on the upper end and the bottom end of the dewaterer, respectively, by means of a flange. The rod electrode is connected with the dewaterer by means of an electrode end cover, and the high-voltage insulating composite electrode and the bare electrode are internally placed in the cavity of an oblique electric dewatering tube.

The first-stage degasser implements a first-stage degassing process in the first-stage axial-flow type degassing and dewatering operation according to a trapezoidal seam cone tube and a collision overflow plate, and realizes buffering of the gas-containing and water-containing crude oils and a first-stage dewatering process in the first-stage axial-flow type collision buffer degassing and dewatering operation, forming a first-stage crude oil after removing some of gas and water in the gas-containing and water-containing crude oil. The first-stage degasser is lined with an epoxy resin which comprises a trapezoidal seam cone tube, a collision overflow plate, a column buffer tube, an upper fluid bleeding tube, a lower fluid bleeding tube, a first-stage water bleeding tube, and a first-stage gas bleeding tube.

The trapezoidal seam cone tube uses a communicated tubule with a variable diameter. The trapezoidal seam cone tube and the column buffer tube are disposed concentrically. The trapezoidal seam cone tube is formed by combining a first-stage straight tube section and a first-stage cone tube section. The first-stage straight tube section serves as an inlet channel for gas-containing and water-containing crude oils to enter into the first-stage degasser. The tube wall of the first-stage cone tube section is milled with trapezoidal seams uniformly distributed along the circumferential direction. The trapezoidal seams maintain parallel to the axis of the trapezoidal seam cone tube along the lengthwise direction; the trapezoidal seams are internally thin and externally thick along the radial direction of the trapezoidal seam cone tube. Some of the gas-containing and water-containing crude oil flows into the collision degassing lumen of the column buffer tube via the trapezoidal seams of the trapezoidal seam cone tube.

The collision overflow plate uses an arched curved steel plate, and the collision overflow plate is fixed on the tube wall of the column buffer tube by means of circumferential welding. The upper steel plate of the collision overflow plate radially presents a sector along the column buffer tube, and the upper steel plate is drilled with overflow apertures uniformly arranged along the circumference of the column buffer tube. Annular passageways are used for overflow apertures. The lower steel plate of the collision overflow plate axially presents a semicircular shape along the column buffer tube, and the axis of the lower steel plate of the collision overflow plate is overlapping with the center line of the first-stage cone tube section of the trapezoidal seam cone tube. Meanwhile, the round face of the big end of the first-stage cone tube section of the trapezoidal seam cone tube has a radius smaller than the height of the upper steel plate of the collision overflow plate along the radial direction of the column buffer tube to ensure that all of the gas-containing and water-containing crude oil that splashes via the collision overflow plate falls back into a collision degassing lumen of the column buffer tube.

The column buffer tube uses a thick and long tube with both ends closed, and is disposed obliquely. One end of the column buffer tube uses a blind flange, while the flange on the other end is provided with a round hole, realizing fixation between a trapezoidal seam cone tube and the column buffer tube by means of circumferential welding. The column buffer tube is separated into a collision degassing lumen and a buffer dewatering lumen by a collision overflow plate. The collision dewatering lumen of the column buffer tube maintains communicating with the trapezoidal seam cone tube and the first-stage gas bleeding tube, respectively. The buffer dewatering lumen maintains communicating with an upper liquid bleeding tube, a lower liquid bleeding tube and a first-stage water bleeding tube.

The upper liquid bleeding tube and the lower liquid bleeding tube use three-way thick and short tubes with equal diameters. The upper liquid bleeding tube and the lower liquid bleeding tube are used for sending the first-stage crude oil upon the first-stage degassing and the first-stage dewatering to the second-stage degasser. The first-stage water bleeding tube uses a three-way thin and long tube with an equal diameter. The first-stage water bleeding tube is used for converging and discharging primary sewage upon first-stage dewatering. The first-stage gas bleeding tube uses a three-way thin and long tube with a variable diameter. The first-stage gas bleeding tube is used for converging and discharging the first-stage gas upon first-stage degassing. The axis of the first-stage gas bleeding tube, the axis of the upper liquid bleeding tube, the axis of the lower liquid bleeding tube and the axis of the first-stage water bleeding tube keep parallel to each other, and are intersected with the axis of the column buffer tube at the same time. The first-stage gas bleeding tube is located on the middle part of the collision degassing tube of the column buffer tube. The upper liquid bleeding tube and the lower bleeding tube are located on the upper part and the middle part of the buffer dewatering lumen of the column buffer tube, respectively. The first-stage gas bleeding tube, the upper liquid bleeding tube and the lower liquid bleeding tuber have increasing tube diameters in turn, and are disposed upwards along the vertical direction. The first-stage water bleeding tube is located at the bottom of the column buffer tube, and is disposed downwards along the vertical direction.

The first-stage axial-flow type degassing and dewatering operation process is as follows: a gas-containing and water-containing crude oil flows into the first-stage degasser. Some of the gas-containing and water-containing crude oil has gradually increasing gaps when flowing outside through each trapezoidal seam such that the oil pressure in the trapezoidal seam is decreasing gradually, thereby realizing preliminary degassing. The other part of the gas-containing and water-containing crude oilis ejected from the right of the trapezoidal seam cone tube, and is collided and converged to the collision overflow plate. Afterwards, this part of gas-containing and water-containing crude oil has a rapidly changed flowing direction and speed, thereby realizing secondary degassing, and completing the first-stage degassing operation. The first-stage gas upon first-stage degassing is discharged by the first-stage gas bleeding tube. Meanwhile, the oil upon first-stage degassing enters into the buffer dewatering lumen of the column buffer tube through each overflow aperture of the collision overflow plate for buffering. Large particles with a great specific weight in the buffer dewatering tube lumen are settled under the action of gravity, and slip along the tube wall of the column buffer tube downwards to the first-stage water bleeding tube, and thereby are converged to primary sewage. After the primary sewage is discharged, the first-stage dewatering operation is completed. The first-stage crude oil upon first-stage dewatering flows into the second-stage degasser by the upper liquid bleeding tube and the lower liquid bleeding tube, respectively.

The second-stage degasser sends the first-stage crude oil to the oblique degassing tube according to the upper liquid feeding tube and the lower liquid feeding tube, and implements the second-stage elevated efficient degassing operation, forming a second-stage crude oil after removing the remaining gas in the first-stage crude oil. The second-stage degasser is lined with an epoxy resin which comprises an oblique degassing tube, an upper liquid feeding tube, a lower liquid feeding tube, and a second-stage gas bleeding tube.

The oblique degassing tube uses a thick and long tube with the upper end closed, and is disposed obliquely. The upper end of the oblique degassing tube uses a blind flange. The volume of the oblique degassing tube is smaller than that of the column buffer tube, and the angle formed by the axis of the oblique degassing tube and the horizontal plane is greater than the angle formed by the axis of the column buffer tube and the horizontal plane. The oblique degassing tube is divided into a second-stage degassing lumen, a second-stage liquid feeding lumen and a second-stage liquid bleeding lumen in turn from top to bottom along the axial direction. The second-stage degassing lumen of the oblique degassing tube maintains communicating with the second-stage gas bleeding tube. The second-stage liquid feeding lumen maintains communicating with the buffer dewatering tube of the column buffer tube through the upper liquid feeding tube and the lower liquid feeding tube and by the upper liquid bleeding tube and the lower liquid bleeding tube. The second-stage liquid bleeding tube maintains communicating with a flow mixing tube.

The second-stage gas bleeding tube uses a three-way thin and long tube with a variable diameter. The upper liquid feeding tube and the lower liquid feeding tube use three-way thick and short tubes with equal diameters. The second-stage gas bleeding tube is located on the top of the second-stage degassing lumen, and is disposed upwards along the vertical direction. The upper liquid feeding tube and the lower liquid feeding tube are located on both sides of the second-stage liquid feeding lumen, and is disposed downwards along the vertical direction. The axis of the second-stage gas bleeding tube, the axis of the upper liquid feeding tube and the axis of the lower liquid feeding tube maintain parallel to each other, and are intersected with the axis of the oblique degassing tube at the same time. Moreover, the axes of the column buffer tube, the upper liquid bleeding tube and the lower liquid bleeding tube as well as the axes of the oblique degassing tube, the upper liquid feeding tube and the lower liquid feeding tube are located on the same plane. The tube diameter of the upper liquid feeding tube equals to that of the upper liquid bleeding tube, and the tube diameter of the lower liquid feeding tube equals to that of the lower liquid bleeding tube at the same time.

The second-stage elevated efficient degassing operation process is as follows: the first-stage crude oil enters into the second-stage liquid feeding lumen of the oblique degassing tube through the upper liquid feeding tube and the lower liquid feeding tube for buffering. Large particles with a great specific weight in the first-stage crude oil within the second-stage degassing lumen are floating upwards due to buoyancy, and are migrated to the second-stage gas bleeding tube along the tube wall of the oblique degassing tube, and thereby are converged to a second-stage gas. At last, the second-stage gas is discharged via the second-stage gas bleeding tube. The second-stage crude oil upon second-stage degassing is settled to the second-stage liquid bleeding lumen, and slips downwards along the tube wall of the oblique degassing tube to the flow mixing tube.

The rod electrode uses a concentric loop laminated squirrel-cage formation, and constructs a dynamic electric field with a high frequency and a high voltage. The oil-containing droplets of the crude oil emulsion in the dynamic electric field with a high frequency and a high voltage are electrostatically coalesced in a dynamic manner, and enlarged rapidly, accordingly implementing high-frequency and high-voltage rapid electric dewatering treatment with a squirrel-cage formation. The rod electrode comprises a terminal post, an electrode end cover, a high-voltage insulating composite electrode, a ground bare electrode and a separating loop plate.

The terminal post uses a main round copper tube and multi-branch round copper tubes. The number of the multi-branch round copper tubes and arrangement mode thereof are the same as that of the high-voltage insulating composite electrodes. All branch manifolds of the multi-branch round copper tubes are converged on the main round copper tube, and are connected with a high-voltage cable.

The high-voltage insulating composite electrode is formed by a high-voltage electrode rod and an insulating coating. The high-voltage electrode rod uses a round copper rod, and is coated externally with an insulating coating. An insulating non-metallic material is selected for the insulating coating of the high-voltage insulating composite electrode. A bare long and round copper rod is used for the grounding bare electrode. The high-voltage insulating composite electrode and the grounding bare electrode are arranged along the radial direction at equal intervals and in a layered manner. Each layer of the high-voltage insulating composite electrode and the grounding bare electrode is distributed uniformly along the circumferential direction. Meanwhile, layers of the high-voltage insulating composite electrode and the grounding bare electrode are disposed concentrically in a staggered manner, and the high-voltage insulating composite electrode is located on the outermost layer and the innermost layer. Accordingly, the high-voltage insulating composite electrode and the grounding bare electrode arranged in a layered manner form a concentric loop laminated squirrel-cage formation.

The upper part of the insulating coating is provided with a cone clamp, and realizes axial positioning of a high-voltage insulating composite electrode. The section of the cone clamp of the insulating coating presents a right trapezoid. The lower part of the insulating coating is provided with a cylindrical snap ring, and realizes axial positioning of a high-voltage electrode loop plate. The lower part of the cylindrical snap ring is processed with threads and configured with a nut made of non-metallic insulation material, realizing insulation and connection between the high-voltage insulating composite electrode and the high-voltage electrode loop plate. An electrode positioning end is provided at the bottom of the insulating coating. A semicircular shape is used for the electrode positioning end for positioning the high-voltage insulating composite electrode and the high-voltage electrode loop plate and ensuring that a continuous and stable high-voltage electric field is formed at the bottom of the high-voltage insulating composite electrode. An insulating bushing is configured at the top of the cone clamp of the insulating coating. The material for the insulating bushing of the high-voltage insulating composite electrode is the same as that of the insulating coating. The insulating bushing is embedded into a circular eyelet of the electrode end cover, and realizes insulation between the high-voltage insulating composite electrode and the high-voltage electrode loop plate. Threads are made on the top of the high-voltage electrode rod, and are fixed on the electrode end cover. Moreover, the high-voltage electrode rod is connected with a terminal post through insulation nuts made of non-metallic insulation material.

Threads are made on one end of the grounding bare electrode, and fitted with respective threaded holes at the blind end of the electrode end cover. Accordingly, one end of the grounding bare electrode is connected with the electrode end cover through threads. Meanwhile, the grounding bare electrode runs through the electrode end cover and is grounded by the dewaterer. The other end of the grounding bare electrode is configured in a hemispherical shape. An interference fit is used between the grounding bare electrode and a round hole for the grounding electrode of the separating loop plate. Accordingly, the other end of the grounding bare electrode is connected with the grounding electrode loop plate by means of the interference fit.

A copper flange is used for the electrode end cover, and serves as a motherboard for the high-voltage insulating composite electrode and the grounding bare electrode, and realizes sealing of the dewaterer ends at the same time. The electrode end cover is drilled thereon with circular eyelets with the same number and specification as that of high-voltage insulating composite electrodes. Meanwhile, the lower end face of the electrode end cover is made with threaded holes at the blind end with the same number and specification as that of the grounding bare electrodes.

The separating loop plate uses a non-metallic insulation material, and coating loop plate is located on the outer circular surface of the outermost layer of the high-voltage electrode loop plate, and is closely fitted with the tube wall on the upper end of the oblique liquid feeding tube. The high-voltage electrode loop plate and the grounding electrode loop plate are provided thereon with high-voltage electrode round holes and grounding electrode round holes circumferentially distributed, respectively. The high-voltage electrode round holes of the high-voltage electrode loop plate are fitted with the bottom of the insulating coating of the high-voltage insulating composite electrode. A circular passageway is formed between the high-voltage electrode loop plate and the grounding electrode loop plate. Meanwhile, the high-voltage electrode loop plate and the grounding electrode loop plate are processed with an arched aperture passageway on the outer circular surface and inner circular surface along the radial direction, avoiding contact between high-voltage insulating composite electrodes and grounding bare electrodes in the electric dewatering operation due to changes in temperature, and increasing the effective sectional area of the crude oil emulsion flow channel to the largest extent. The arched aperture passageways of the high-voltage electrode loop plate and the grounding electrode loop plates are distributed circumferentially and uniformly. Moreover, the arched aperture passageways of the high-voltage electrode loop plate and high-voltage insulating composite electrodes are disposed at interval, and the arched hold passageways of the grounding electrode loop plate and the grounding bare electrodes are disposed at interval.

The dewaterer together with the rod electrode implements a high-frequency and high-voltage rapid dewatering operation of the third-stage squirrel-cage formation to form a qualified crude oil after removing the remaining water in the crude oil emulsion. The dewaterer is lined with metal ceramic which comprises an oblique electric dewatering tube, an oblique liquid feeding tube, an oblique settling tube, a flow mixing tube, a pharmaceutical tube, and an oil bleeding tube.

The oblique electric dewatering tube, the oblique liquid feeding tube, and the oblique settling tube use a thick and short tube communicating at both ends, and are connected through a flange as one. The oblique electric dewatering tube, the oblique liquid feeding tube, and the oblique settling tube have equal tube diameters and wall thicknesses, and the oblique electric dewatering tube, the oblique liquid feeding tube, and the oblique settling tube are disposed concentrically and obliquely from top to bottom. The axes of the oblique electric dewatering tube, the oblique liquid feeding tube, and the oblique settling tube are located on the same vertical plane as that of the column buffer tube.

The middle tube wall of the oblique electric dewatering tube is drilled with a round hole, and is connected with the oil bleeding tube by means of circumferential welding. The oblique electric dewatering tube maintains communicating with the oil drainer through an oil bleeding tube, and is provided internally with a high-voltage insulating composite electrode and a grounding bare electrode to form an electric dewatering zone with a squirrel-cage formation. The middle tube wall of the oblique liquid feeding tube is drilled with a round hole, and is connected with the flow mixing tube by means of circumferential welding. The oblique liquid feeding tube maintains communicating with the second-stage liquid bleeding lumen through the flow mixing tube, and forms an emulsion buffer zone. The oblique settling tube maintains communicating with the water drainer, and forms an elevated settling zone.

The oblique electric dewatering tube, the oblique liquid feeding tube, and the oblique settling tube are disposed reversely and crossly with the oblique degassing tube at the same time. Moreover, the elevation angles formed by the axes of the oblique electric dewatering tube and the oblique liquid feeding tube and the oblique settling tube, and the horizontal plane are greater than that formed by the axis of the oblique degassing tube and the horizontal plane. Meanwhile, the tube diameters of the oblique electric dewatering tube, the oblique liquid feeding tube, and the oblique settling tube are greater than that of the oblique degassing tube and the column buffer tube. The volume sum of the oblique electric dewatering tube, the oblique liquid feeding tube, and the oblique settling tube are greater than six times of the volume of the oblique degassing tube.

The flow mixing tube uses a thick and long elbow tube with an equal diameter, and realizes full mixing of the second-stage crude oil and a chemical medicament. The flow mixing tube consists of an inlet liquid bleeding tube section, a crude oil reversing tube section, and an outlet flow mixing tube section. The tube diameter of the flow mixing tube equals to that of the oblique degassing tube, and is greater than that of the pharmaceutical tube. The flow mixing tube is disposed concentrically between the axes of the inlet liquid bleeding tube section vertically located on the upper part and the axis of the oblique degassing tube. The crude oil reversing tube section is used for changing the flowing direction of the second-stage crude oil in the flow mixing tube. Moreover, the angle formed by the axis of the inlet liquid bleeding tube section and the axis of the outlet flow mixing tube section is an obtuse angle, and the angle formed by the axis of the outlet flow mixing tube section of the flow mixing tube located on the lower part and the axis of the oblique liquid feeding tube is an acute angle.

A thin and straight tube is used for the pharmaceutical tube. The axis of the pharmaceutical tube is vertically intersected with that of the outlet flow mixing tube section of the flow mixing tube, and the pharmaceutical tube is located on the upper part of the outlet flow mixing tube section. A short and straight tube is used for the oil bleeding tube. The axis of the oil bleeding tube is vertically intersected with that of the oblique electric dewatering tube.

The third-stage high-frequency and high-voltage rapid dewatering operation is as follows: the second-stage crude oil at the inlet of the flow mixing tube is fully mixed with the chemical medicament inputted by the pharmaceutical tube at the outlet flow mixing tube section, thereby forming a crude oil emulsion. Afterwards, the crude oil emulsion, after entering into the emulsion buffer zone of the oblique liquid feeding tube for buffering, flows upwards into the squirrel-cage formation electrical dewatering zone of the oblique electric dewatering tube. The oil-containing droplets of the crude oil emulsion in the high-frequency high-voltage dynamic electric field constructed by the rod electrode are electrostatically coalesced in a dynamic manner, and enlarged rapidly, accordingly implementing high-frequency and high-voltage rapid electric dewatering treatment with a squirrel-cage formation. The oil phase is elevated to the upper part of the oblique electric dewatering tube, and forms a qualified crude oil. The qualified crude oil upon third-stage electric dewatering is discharged through the oil drainer. The water droplets are settled, and converged along the tube wall of the oblique liquid feeding tube to the elevated settling zone of the oblique settling tube, forming secondary sewage. The secondary sewage upon third-stage electric dewatering is discharged by the water drainer.

The qualified crude oil delivered by the oil drainer is adjusted to a uniform flow. The oil drainer is connected with the dewaterer as a whole through the crude oil bleeding tube and the flange of the oil bleeding tube. The oil drainer comprises a crude oil bleeding tube, a flow stabilizing rod and a flow stabilizing impeller.

A thin elbow tube with an equal diameter is used for the crude oil bleeding tube. A flow stabilizing rod and a flow stabilizing impeller are embedded in the inlet tube section of the crude oil bleeding tube, and the axis of the inlet tube section of the crude oil bleeding tube is overlapping with that of the oil bleeding tube. The outlet tube section of the crude oil bleeding tube is placed horizontally, ensuring that the qualified crude oil adjusted as a uniform flow can be discharged stably.

A thick and long rod is used for the flow stabilizing rod. The flow stabilizing impeller consists of flow stabilizing blades uniformly disposed along the external circular surface of the flow stabilizing rod. The flow stabilizing blades realize fixation between the flow stabilizing impeller and the flow stabilizing rod radially along the inner end of the flow stabilizing rod by means of welding. An interference fit is used between the cylindrical surface radially along the outer circular surface of the flow stabilizing rod and the tube wall of the inlet tube section of the crude oil bleeding tube. Accordingly, the flow stabilizing impeller realizes axial fixation according to interference fit. Meanwhile, an interference fit is used between the cylindrical surface where the outer circular surface of the flow stabilizing impeller is located and the tube wall of the oil bleeding tube. A plate-sheet construction is used for the flow stabilizing blades. Respective flow stabilizing blades of the flow stabilizing impeller form conical surfaces axially along the flow stabilizing rod, and the conicity of the conical surface axially along the outer side of the flow stabilizing impeller is greater than that along the inner side thereof. Meanwhile, conical surfaces are used on both end faces of the flow stabilizing rod, thereby reducing fluid friction losses when the qualified crude oil flows in and out of the flow stabilizing rod and the flow stabilizing impeller.

The secondary sewage in the oblique settling tube has its flowing direction adjusted and is integrated to a stable flow by the water drainer, thereby preventing production of a vortex. The water drainer is connected with the dewaterer to be a whole through the liquid feeding tube with a variable diameter and the flange of the oblique settling tube. The water drainer comprises a second-stage water bleeding tube, a fluid feeding tube with a variable diameter, an anti-vortex rod, and an anti-vortex impeller.

A thin and long straight tube is used for the second-stage water bleeding tube which is internally placed on a side of the anti-vortex rod and the anti-vortex impeller. The second-stage water bleeding tube is connected at the bottom of the water drainer through a flange. The second-stage water bleeding tube and the flow stabilizing straight tube section of the liquid feeding tube with a variable diameter are disposed concentrically.

An elbow tube with a variable cross section is used for the liquid feeding tube with a variable diameter. The liquid feeding tube with a variable diameter consists of a pressure regulating tube section with a variable diameter, a water bleeding elbow tube section, and a flow stabilizing straight tube section. Conical surfaces are used on inner and outer tube walls of the pressure regulating tube section with a variable diameter. The diameter of the round face at the big end of the conical surface where the inner tube wall of the pressure regulating tube section with a variable diameter is located equals to the inner diameter of the oblique settling tube, and the diameter of the round face at the small end where the inner tube wall is located equals to the tube diameter of the flow stabilizing straight tube section, thereby adjusting the flowing pressure between the liquid feeding tube with a variable diameter and the second-stage water bleeding tube. The water bleeding elbow tube section realizes changes in the flowing direction of the secondary sewage in the liquid feeding tube with a variable diameter, and the flow stabilizing tube section is disposed horizontally, and is internally placed on the other side of the anti-vortex rod and the anti-vortex impeller.

The anti-vortex impeller and the anti-vortex rod may prevent production of a vortex due to siphoning during discharging of the secondary sewage. A thin and short rod is used for the anti-vortex rod. Conical surfaces are used on both end faces of the anti-vortex rod. The anti-vortex impeller consists of anti-vortex blades uniformly disposed along the outer circular surface of the anti-vortex rod. Fixation between the anti-vortex impeller and the anti-vortex rod is realized on inner ends of the anti-vortex blades radially along the anti-vortex rod. An interference fit is used between the cylindrical surface of the anti-vortex impeller radially along the outer circular surface of the flow stabilizing rod and the flow stabilizing straight tube wall of the liquid feeding tube with a variable diameter. Accordingly, the flow stabilizing impeller realizes axial fixation according to the interference fit. Meanwhile, an interference fit is used between the cylindrical surface where the outer circular surface of the flow stabilizing impeller is located and the tube wall of the second-stage water bleeding tube. A helical blade construction is used for the flow stabilizing blades. The contour lines of the anti-vortex blades are helical lines unfolded along the outer circular surface of the anti-vortex rod, and the screw pitches of the helical lines where the contour lines of the anti-vortex blades are located are increasing gradually along the axial direction of the anti-vortex rod. Meanwhile, the tangent lines between both endpoints of the helical lines where the contour lines of anti-vortex blades are located maintain parallel to the axis of the anti-vortex rod, thereby ensuring that secondary sewage is smoothly cut into the anti-vortex blades and flows into the lumen of the second-stage water bleeding tube along the axial direction of the anti-vortex rod.

The technical effects that can be achieved by the present invention are as follows: the three-stage degassing and dewatering device adopts a three-stage degassing and dewatering technology with vertical, horizontal and elevated T-shaped tubes combined as well as a high-frequency and high-voltage dynamic electric field dewatering technology with a squirrel-cage formation constructed by rod electrodes, and has the characteristics such as highly efficient three-phase separation of oil, gas and water, low water content and low gas content in oil, and low oil content in water. The first-stage degasser implements the first-stage degassing process in the first-stage axial-flow type collision buffer degassing and dewatering operation according to a trapezoidal seam cone tube and a collision overflow plate, and realizes the buffering of gas-containing and water-containing crude oils and the first-stage dewatering process in the first-stage axial-flow type collision buffer degassing and dewatering operation by means of a column buffer tube, forming a first-stage crude oil after removing some of gases and water in the gas-containing and water-containing crude oil. The second-stage degasser sends the first-stage crude oil to the oblique degassing tube by means of the upper liquid feeding tube and the lower liquid feeding tube, and implements the second-stage elevated efficient degassing operation, forming a second-stage crude oil after removing the remaining gas in the second-stage crude oil. The rod electrode uses a concentric loop laminated squirrel-cage formation, and constructs a dynamic electric field with a high frequency and a high voltage. The dewaterer together with the rod electrode implements a third-stage high-frequency and high-voltage rapid dewatering operation, forming a qualified crude oil after removing the remaining water in the crude oil emulsion. After adjusted to a uniform flow by the oil drainer, the qualified crude oil is discharged. The secondary sewage in the oblique settling tube is adjusted and integrated to a uniform flow and then discharged, thereby preventing production of a vortex.

BRIEF DESCRIPTION OF THE DRAWINGS

The present invention is further explained by combining the figures. However, the present invention is not limited to the following examples.

In the figures, 1—first-stage degasser; 2—second-stage degasser; 3—oil drainer; 4—rod electrode; 5—dewaterer; 6—water drainer; 7—trapezoidal seam cone tube; 8—first-stage gas bleeding tube; 9—collision overflow plate; 10—upper liquid bleeding tube; 11—lower liquid bleeding tube; 12—column buffer tube; 13—first-stage water bleeding tube; 14—buffer dewatering lumen; 15—collision degassing lumen; 16—first-stage cone tube section; 17—first-stage straight tube section; 18—overflow aperture; 19—trapezoidal seam cone tube; 20—second-stage degassing lumen; 21—second-stage liquid feeding lumen; 22—second-stage liquid bleeding lumen; 23—lower liquid feeding tube; 24—upper liquid feeding tube; 25—oblique degassing tube; 26—second-stage gas bleeding tube; 27—terminal post; 28—electrode end cover; 29—high-voltage insulating composite electrode; 30—grounding base electrode; 31—separating loop plate; 32—multi-branch round copper tube; 33 main branch round copper tube; 34—high-voltage cable; 35—grounding electrode loop plate; 36—high-voltage electrode loop plate; 37—arched passageway; 38—grounding electrode round hole; 39—high-voltage electrode round hole; 40—insulating nut; 41—insulating bushing; 42—insulating coating; 43—high-voltage electrode rod; 44—electrode positioning end; 45—cylindrical snap ring; 46—cone clamp; 47—oblique electric dewatering tube; 48—oil bleeding tube; 49—pharmaceutical tube; 50—flow mixing tube; 51—inlet liquid bleeding tube section; 52—crude oil reversing tube section; 53—outlet flow mixing tube section; 54—oblique liquid feeding tube; 55—oblique settling tube; 56—elevated settling zone; 57—emulsion buffer zone; 58—electric dewatering zone with a squirrel-cage formation; 59—crude oil bleeding tube; 60—flow stabilizing rod; 61—flow stabilizing impeller; 62—flow stabilizing blade; 63—liquid feeding tube with a variable diameter; 64—anti-vortex impeller; 65—anti-vortex rod; 66—second-stage water bleeding tube; 67—anti-vortex blade; 68—flow stabilizing straight tube section; 69—water bleeding elbow tube section; 70—pressure regulating tube section with a variable diameter.

EMBODIMENTS

Figure 1:
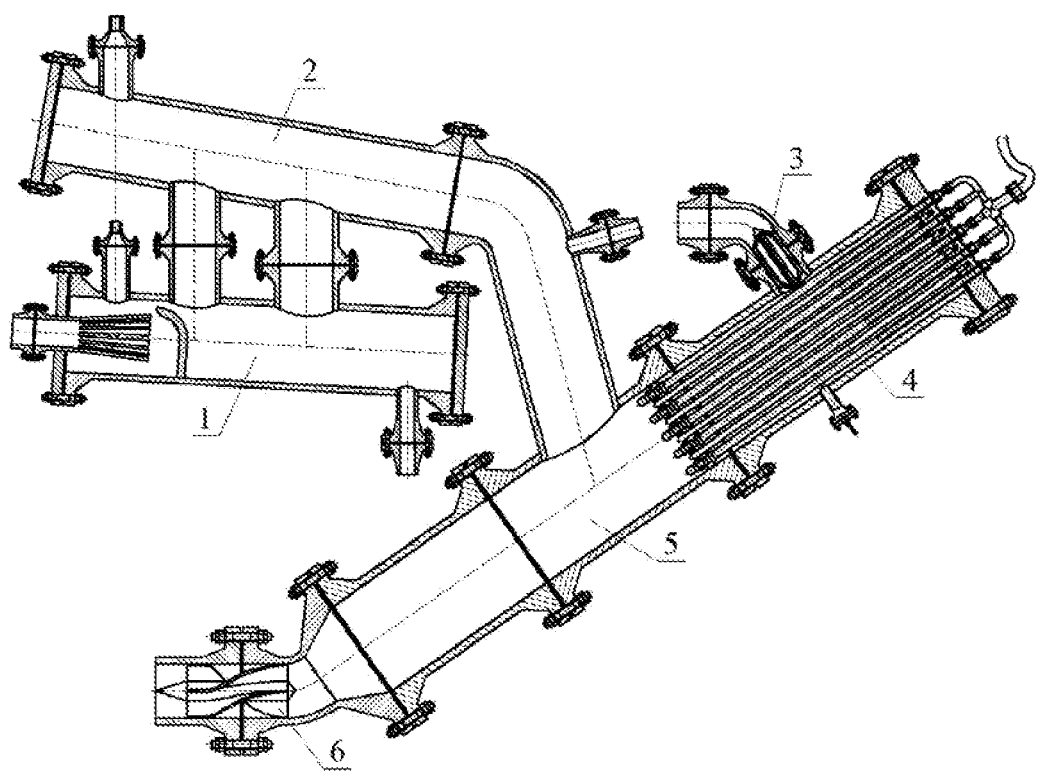
FIG. 1 is a typical structure diagram of a three-stage degassing and dewatering device with tube network and rod electrode squirrel-cage formation in the present invention.

In FIG. 1, a three-stage degassing and dewatering device with a tube network and a rod electrode squirrel-cage formation comprised a first-stage degasser 1, a second-stage degasser 2, an oil drainer 3, a rod electrode 4, a dewaterer 5, and a water drainer 6. With a three-stage degassing and dewatering technology with vertical, horizontal and elevated T-shaped tubes combined as well as a high-frequency and high-voltage dynamic electric field dewatering technology with a squirrel-cage formation constructed by rod electrodes, the three-stage degassing and dewatering device implemented a first-stage axial-flow type collision buffer degassing and dewatering operation according to the first-stage degasser 1, and implemented a second-stage elevated efficient degassing operation through the second degasser 2; and meanwhile, implemented a third-stage high-frequency and high-voltage rapid dewatering operation according to the rod electrode 4 and the dewaterer 5, which effectively solved the problem of efficiently separating gas-containing and water-containing crude oil.

In FIG. 1, the first-stage degasser 1 and the second-stage degasser 2 were connected as a whole by means of the upper liquid bleeding tube and the lower liquid bleeding tube as well as the upper liquid feeding tube and the lower liquid feeding tube. The second-stage degasser 2 was connected with the dewaterer 5 by means of the flow mixing tube. The oil drainer 3 and the water drainer 6 were fixed on the upper end and the bottom end of the dewaterer 5, respectively, by means of a flange. The rod electrode 4 was connected with the dewaterer 5 by means of an electrode end cover. A high-voltage insulating composite electrode and a bare electrode of the rod electrode 4 were internally mounted in the dewaterer 5.

In FIG. 1, the specification of the three-stage degassing and dewatering device with a tube network and a rod electrode squirrel-cage formation as well as the number of skid mounting devices which are connected in parallel therewith after assembly shall be considered comprehensively according to the physical parameters such as flow and flowing pressure of the gas-containing and water-containing crude oil, content water in oil, and gas content in oil. When voltage withstand test, air tightness test and the like were carried out on the three-stage degassing and dewatering device, the test pressure shall achieve 1.25 times of the pressure designed for the whole device.

In FIG. 1, when the three-stage degassing and dewatering device with a tube network and a rod electrode squirrel-cage formation was maintained, whether there were foreign matters accumulated in the column buffer tube of the first-stage degasser 1, the inclined degassing tube of the second-stage degasser 2, the inclined dewatering tube of the dewaterer 5, the inclined liquid feeding tube and the inclined settling tube lumen shall be checked strictly in turn, and the greasy dirt on the flow stabilizing rod of the oil drainer 3, the high-voltage insulating composite electrode of the rod electrode 4, the grounding bare electrode, and a separating loop plate shall be checked in turn. When the maximum thickness of the greasy dirt exceeded 3.0 mm, all members shall be cleaned.

Figure 2:
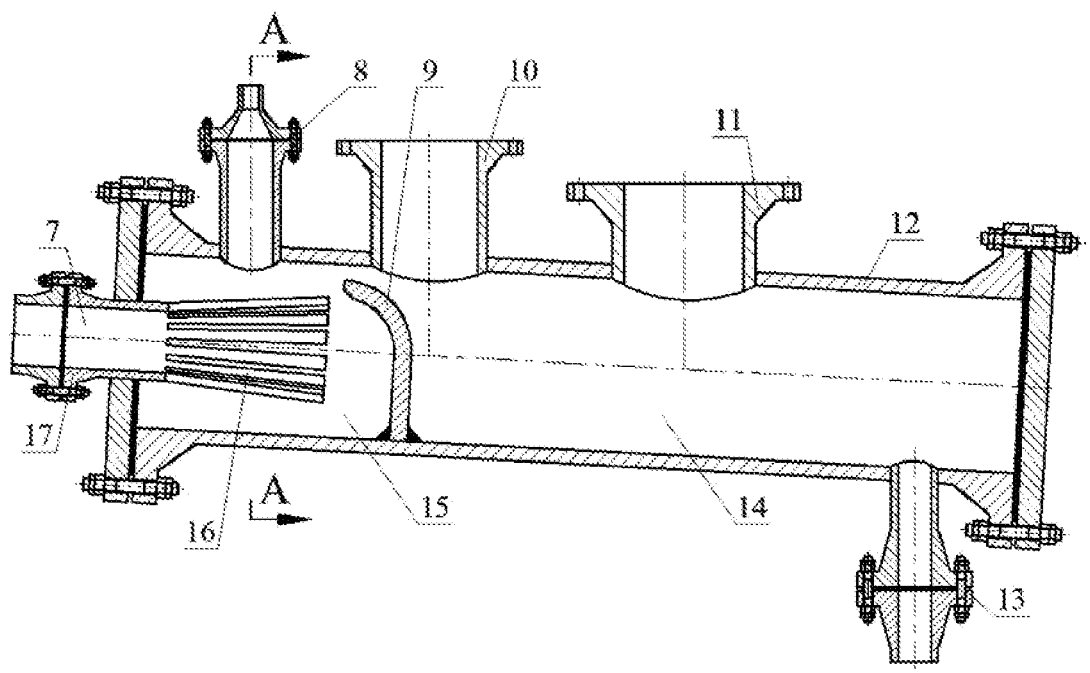
FIG. 2 is a structure diagram of the first-stage degasser in the three-stage degassing and dewatering device with tube network and rod electrode squirrel-cage formation.
Figure 3:
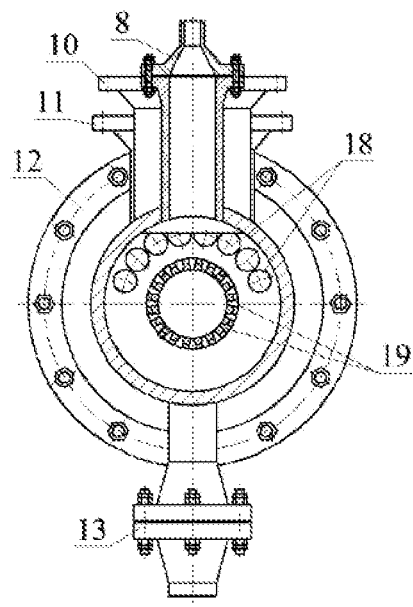
FIG. 3 is an A-A section view of FIG. 2.

In FIGS. 2 and 3, the first-stage degasser 1 implemented the first-stage degassing and the first-stage dewatering processes respectively in the first-stage axial-flow type degassing and dewatering operation according to a trapezoidal seam cone tube 7, a collision overflow plate 9, and a column buffer tube 2. When the volume of the column buffer tube 12 was designed, factors such as flow, flowing pressure and settling time of the gas-containing and water-containing crude oil shall be taken into consideration. When the number of overflow apertures 18 of the collision overflow plate 9 and the positions thereof were designed, factors such as flow, flowing pressure and water content in oil of the gas-containing and water-containing crude oil shall be taken into consideration. When the specifications of the upper liquid bleeding tube 10 and the lower liquid bleeding tube 11 were designed, factors such as flow and flowing pressure of the gas-containing and water-containing crude oil shall be taken into consideration. When the specifications of the first-stage gas bleeding tube 8 and the first-stage water bleeding tube 13 were designed, factors such as gas content in oil and water content in oil of the gas-containing and water-containing crude oil shall be taken into consideration.

In FIGS. 2 and 3, the first-stage straight tube section 17 of the trapezoidal seam cone tube 7 was connected with a manifold that delivered the gas-containing and water-containing crude oil. Some of the gas-containing and water-containing crude oil flowed into a collision degassing lumen 15 through respective trapezoidal seams 19 of the first-stage cone tube section 16, while the other part of the gas-containing and water-containing crude oil fell into the collision degassing lumen 15 after collided and converged to the collision overflow plate 9. The first-stage gas bleeding tube 8 was connected with a manifold that delivered gas, and exhausted the first-stage gas upon first-stage degassing, and the oil after first-stage degassing entered into the buffer dewatering lumen 14 through an overflow aperture 18 for buffering. The first-stage water bleeding tube 13 was connected with a manifold that delivered sewage, and discharged primary sewage after the first-stage degassing operation. The upper liquid bleeding tube 10 and the lower liquid bleeding tube 11 were connected with the second-stage degasser 2, and exhausted the first-stage crude oil after first-stage dewatering.

Figure 4:
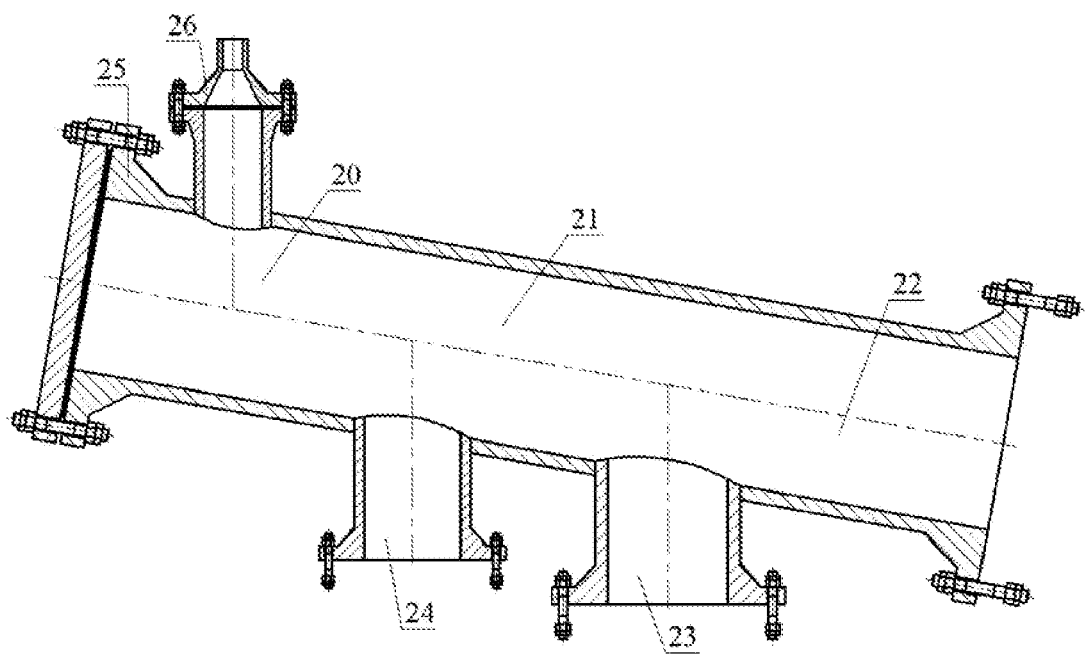
FIG. 4 is a structure diagram of the second-stage degasser in the three-stage degassing and dewatering device with tube network and rod electrode squirrel-cage formation.

In FIG. 4, the second-stage degasser 2 implemented a second-stage elevated efficient degassing operation according to an oblique degassing tube 25. When the volume of the oblique degassing tube 25 was designed, factors such as flow, flowing pressure and settling time of the first-stage crude oil shall be taken into consideration. When the specifications of the lower liquid feeding tube 23 and the upper liquid feeding tube 24 were designed, factors such as flow and flowing pressure of the first-stage crude oil shall be taken into consideration. When the specification of the second-stage gas bleeding tube 26 was designed, factors such as gas content in oil of the first-stage crude oil shall be taken into consideration.

In FIG. 4, the lower liquid feeding tube 23 and the upper liquid feeding tube 24 were connected with the lower liquid bleeding tube 11 and the upper liquid bleeding tube 10, respectively, and delivered the first-stage crude oil to the second-stage liquid feeding lumen 21 of the oblique degassing tube 25. The second-stage gas bleeding tube 26 was connected with a manifold that delivered a gas, and exhausted the second-stage gas released from the second-stage degassing lumen 20. The second-stage liquid bleeding lumen 22 maintained communicating with the dewaterer 5 through a flow mixing tube, and converged and exhausted the second-stage crude oil after second-stage degassing.

Figure 5:
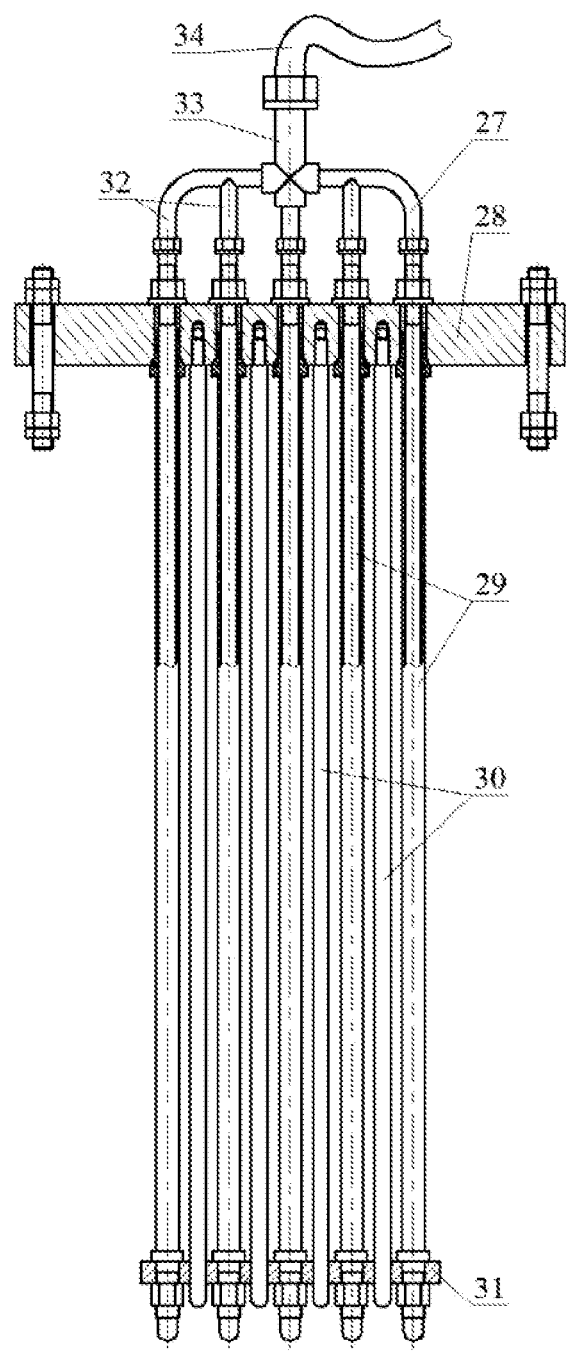
FIG. 5 is a structure diagram of the rod electrode in the three-stage degassing and dewatering device with tube network and rod electrode squirrel-cage formation
Figure 6:
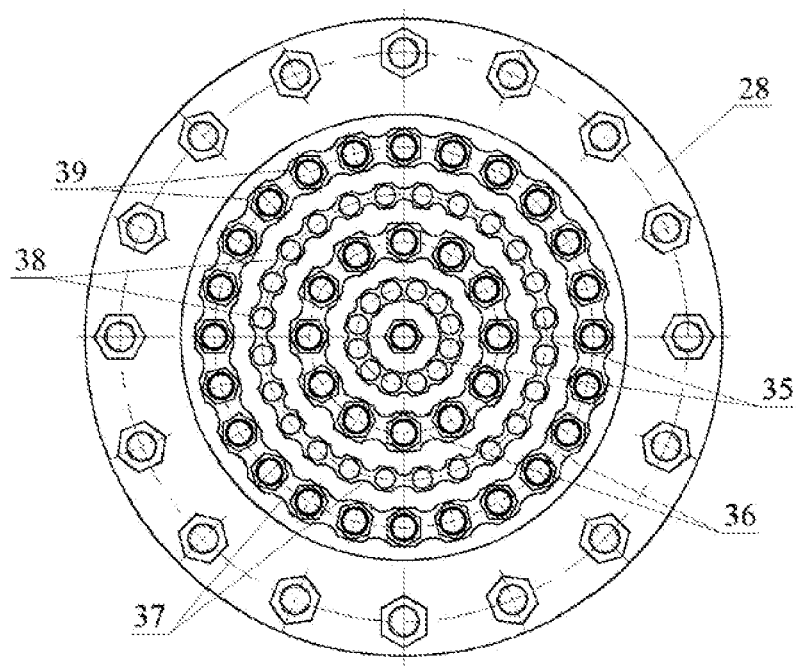
FIG. 6 is a vertical view of FIG. 5.
Figure 7:
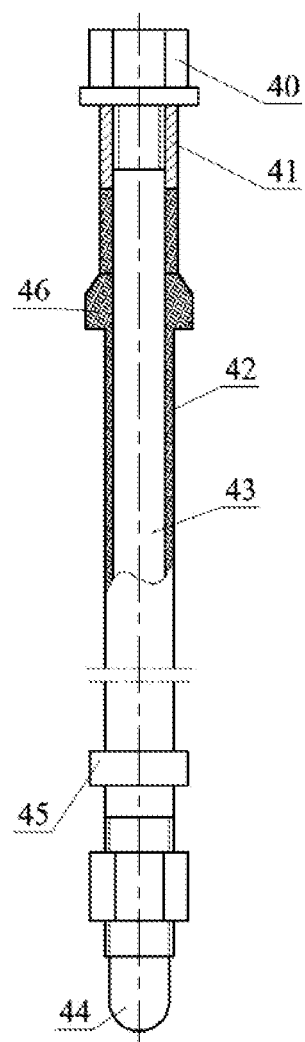
FIG. 7 is a structure diagram of the high-voltage insulating composite electrode in the rod electrode.

In FIGS. 5-7, the rod electrode 4 constructed a dynamic electric field with a high frequency and a high voltage. The specifications of the high-voltage insulating composite electrode 29 and the grounding bare electrode 30 as well as the numbers of electrodes were designed comprehensively according to factors such as maximum flow, maximum flowing pressure, water content in oil, and water content in the qualified crude oil. The water content in the qualified crude oil was adjusted according to parameters such as interlayer spacing of the concentric loop laminated squirrel-cage formations of the high-voltage insulating composite electrode 29 and the grounding bare electrode 30, electrode spacing, lengths and inclinations of electrodes, voltages applied, and intensity of electric field. The number of multi-branch round copper tubes 32 of the terminal post 27 as well as the arrangement mode thereof were the same as that of the high-voltage insulating composite electrode 29. The specification of the electrode end cover 28 maintained consistent with that of the dewaterer 5.

In FIGS. 5-7, the rod electrode 4 was powered through a high-voltage cable 34. Respective multi-branch round copper tubes 32 were converged in a main round copper tube 33, and were connected with the high-voltage electrode 43 through an insulating nut 40. The high-voltage insulating composite electrode 29 and the grounding bare electrode 30 were connected with the terminal post 27 to be a whole through an electrode end cover 28. A circular passageway was formed between the grounding electrode loop plate 35 of the separating loop plate 31 and the high-voltage electrode loop plate 36, and combining an arched aperture passageway 37 thereon could increase an effective sectional area of the flow channel of the crude oil emulsion. The high-voltage electrode round hole 39 was fitted with the bottom of the insulating coating 42. An interference fit was used between the grounding bare electrode 30 and the grounding electrode round hole 38. An insulating bushing 41 realized insulation between the high-voltage insulating composite electrode 29 and the electrode end cover 28. The high-voltage insulating composite electrode 29 and the high-voltage electrode loop plate 36 were fixed through an electrode positioning end 44. A cylindrical snap ring 45 and a cone clamp 46 realized axial positioning of the high-voltage electrode loop plate 36 and the high-voltage insulating composite electrode 29.

Figure 8:
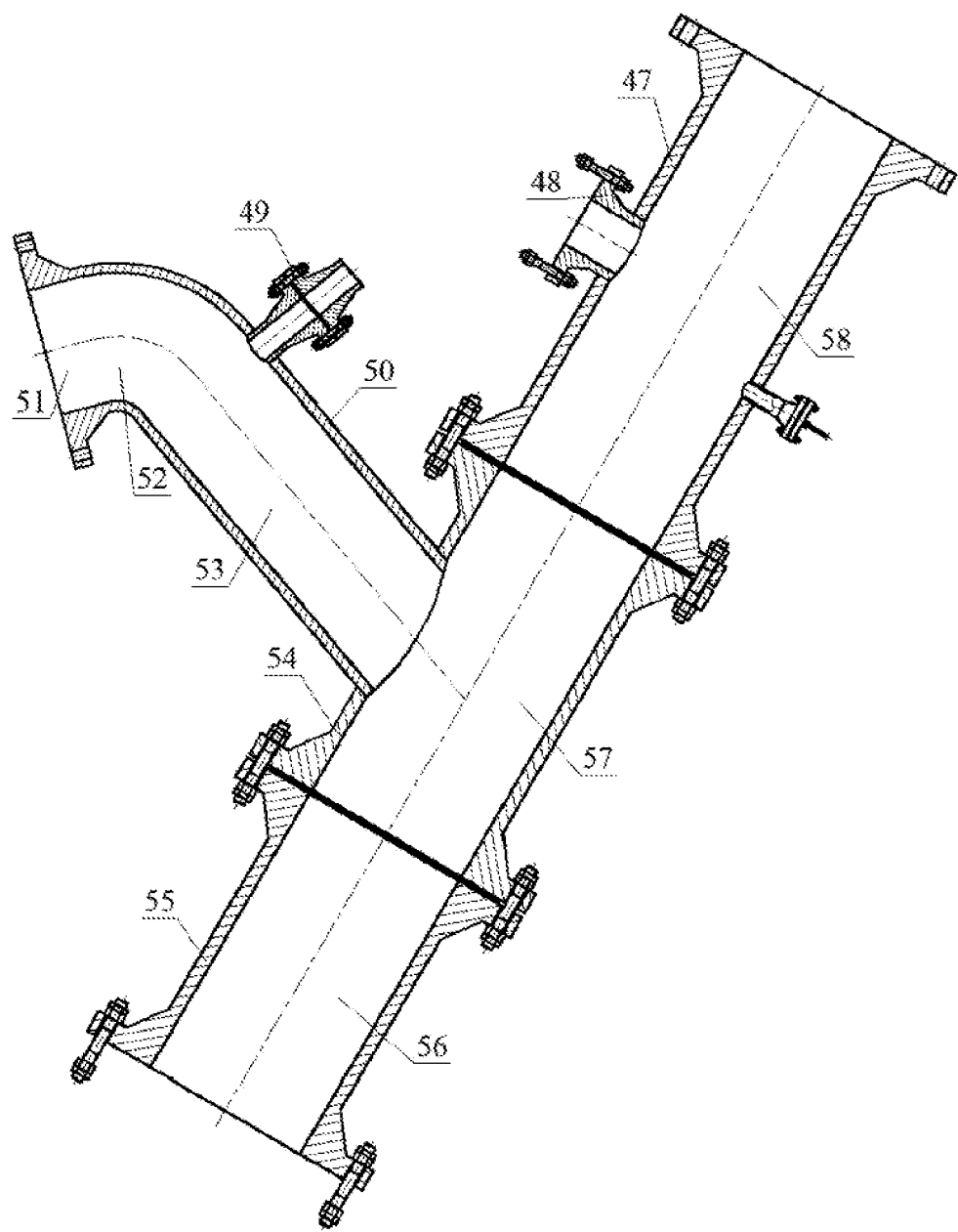
FIG. 8 is structure diagram of the dewaterer in the three-stage degassing and dewatering device with tube network and rod electrode squirrel-cage formation.

In FIG. 8, the dewaterer 5 together with the rod electrode 4 implemented a high-voltage rapid dewatering operation with a third-stage squirrel-cage formation. When the total volume of the oblique electric dewatering tube 47, the oblique liquid feeding tube 54 and the oblique settling tube 55 was designed, factors such as flow, flowing pressure and dewatering time of the crude oil emulsion and water content shall be taken into consideration. When the specification of the oil bleeding tube 48 was designed, factors such as flow and flowing pressure of the qualified crude oil shall be taken into consideration. When the specification of the pharmaceutical tube 49 was designed, factors such as type, flow and flowing pressure of the chemical medicament inputted shall be taken into consideration. When the specification of the flow mixing tube 50 was designed, factors such as flow and flowing pressure of the second-stage crude oil shall be taken into consideration.

In FIG. 8, the flow mixing tube 50 was fixed on the middle tube wall of the oblique liquid feeding tube 54 by means of circumferential welding. After the flowing direction of the second-stage crude oil was adjusted through the inlet liquid bleeding tube section 51 and the crude oil reversing tube section 52, the second-stage crude oil was fully mixed with the chemical medicament inputted by the pharmaceutical tube 49 in the outlet flow mixing tube section 53, forming a crude oil emulsion. The oil bleeding tube 48 was fixed on the middle tube wall of the oblique electric dewatering tube 47 by means of circumferential welding. The oblique settling tube 55 was connected with the water drainer 6 through a flange. After the crude oil emulsion entered into the emulsion buffer zone 57 through the flow mixing tube 50 for buffering, a qualified crude oil was formed in the electric dewatering zone 58 with a squirrel-cage formation, and secondary sewage was formed in the elevated settling zone 56.

Figure 9:
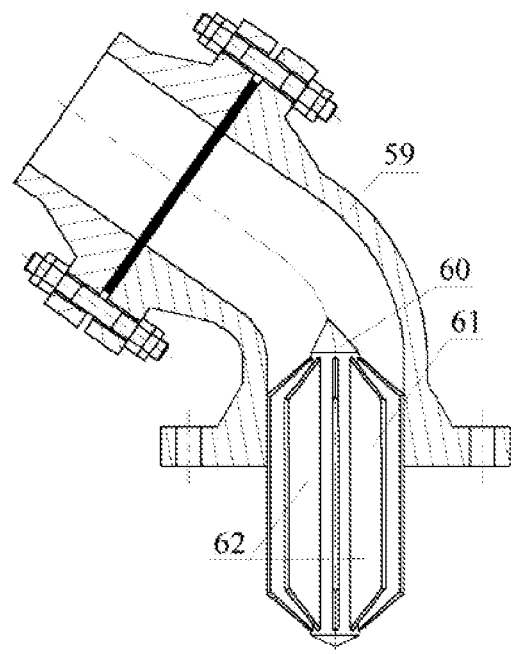
FIG. 9 is a structure diagram of the oil drainer in the three-stage degassing and dewatering device with tube network and rod electrode squirrel-cage formation.
Figure 10:
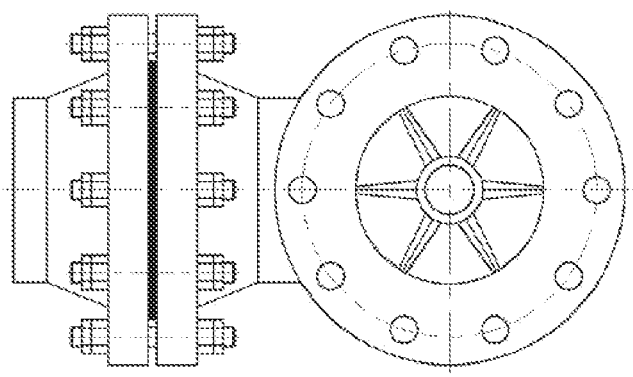
FIG. 10 is a vertical view of FIG. 9.

In FIGS. 9 and 10, the oil drainer 3 adjusted the qualified crude oil delivered by the oil bleeding tube 48 to a uniform flow. When the specification of the crude oil bleeding tube 59 was designed, factors such as flow and flowing pressure of the qualified crude oil shall be taken into consideration. When the conicity of the conical surface of the flow stabilizing blades 62 of the flow stabilizing impeller 61 axially along both ends of the flow stabilizing rod 60 was designed, factors such as flow, flowing pressure, viscosity and density of the qualified crude oil shall be taken into consideration.

In FIGS. 9 and 10, the oil drainer 3 was connected with the dewaterer 5 to be a whole through the crude oil bleeding tube 59 and the flange of the oil bleeding tube 48. Respective flow stabilizing blades 62 were welded uniformly on the outer circular surface of the flow stabilizing rod 60. The flow stabilizing impeller 61 was fixed on the inlet tube section of the crude oil bleeding tube 59 according to the interference fit.

Figure 11:
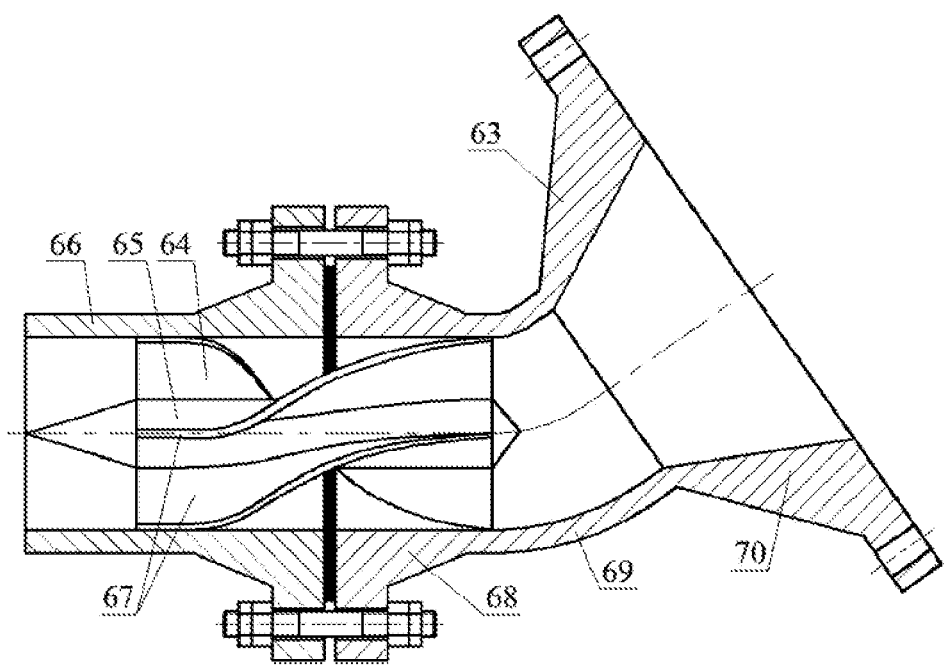
FIG. 11 is a structure diagram of the water drainer in the three-stage degassing and dewatering device with tube network and rod electrode squirrel-cage formation.

In FIG. 11, the secondary sewage of the oblique settling tube 55 had its flowing direction adjusted and was integrated to a stable flow by the water drainer 6. When the specifications of the liquid feeding tube 63 with a variable diameter and the second-stage water bleeding tube 66 were designed, factors such as water content in oil of the qualified crude oil shall be taken into consideration. When the screw pitches of the helical lines where the contour lines of respective anti-vortex blades 67 were designed, factors such as flow, flowing pressure and flowing direction of the secondary sewage shall be taken into consideration.

In FIG. 11, the water drainer 6 was connected with the dewaterer 5 to be a whole through the liquid feeding tube 6 with a variable diameter and the flange of the oblique settling tube 55. The pressure regulating tube section 70 with a variable diameter adjusted the flowing pressure between the liquid feeding tube 63 with a variable diameter and the second-stage water bleeding tube 66. The water bleeding elbow tube section 69 realized changes in the flowing direction of the secondary sewage. The anti-vortex impeller 64 was fixed on the flow stabilizing straight tube section 68 according to the interference fit. Respective anti-vortex blades 67 were welded uniformly on the outer circular surface of the anti-vortex rod 65 along the circumferential direction.

Figure 12:
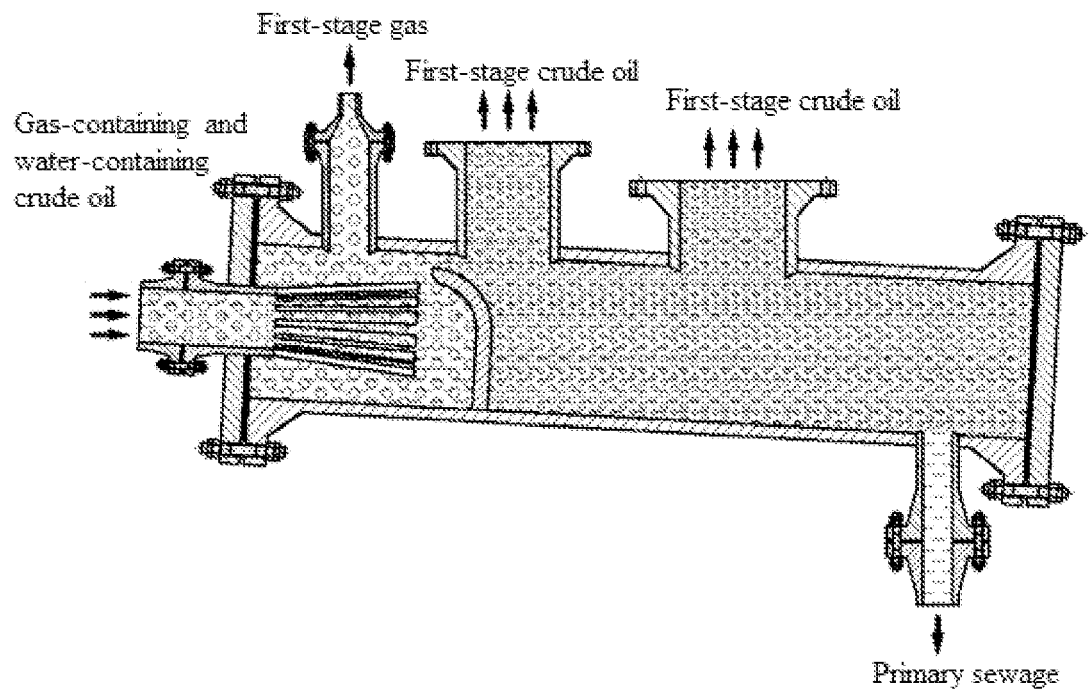
FIG. 12 is a schematic diagram of the first-stage axial-flow type collision buffer degassing and dewatering work flow in the three-stage degassing and dewatering device with tube network and rod electrode squirrel-cage formation.

In FIG. 12, the first-stage axial-flow type degassing and dewatering operation process of the three-stage degassing and dewatering device was as follows: a gas-containing and water-containing crude oil flowed into the first-stage degasser 1 through the first-stage straight tube section 17 of the trapezoidal seam cone tube 7, wherein some of the gas-containing and water-containing crude oil had gradually increasing gaps during flowing outside through each trapezoidal seam 19 such that the oil pressure in the trapezoidal seam 19 was decreasing gradually, thereby falling into the collision degassing lumen 15 after preliminary degassing. At the same time, the other part of the gas-containing and water-containing crude oil was ejected from the right of the first-stage cone tube section 16, and was collided and converged to the collision overflow plate 9. Afterwards, this part of the gas-containing and water-containing crude oil had a rapidly changed flowing direction and speed, thereby falling into the collision degassing tube lumen 15 after secondary degassing, and completing the first-stage degassing operation. The first-stage gas upon first-stage degassing was converged in the first-stage gas bleeding tube 8 above the collision degassing tube lumen 15, and was exhausted. Meanwhile, the oil upon first-stage degassing entered into the buffer dewatering lumen 14 through each overflow aperture 18 for buffering. Large particles with a great specific weight in the buffer dewatering lumen 14 were settled under the action of gravity, and slipped along the tube wall of the column buffer tube 12 downwards to the first-stage water bleeding tube 13, and thereby were converged to first-stage sewage. After the first-stage sewage was exhausted by the first-stage water bleeding tube 13, the first-stage dewatering operation was completed. The first-stage crude oil upon first-stage dewatering still contained some of gas and water, which was converged in the upper liquid bleeding tube 10 and the lower liquid bleeding tube 11, respectively, and afterwards flowed into the second-stage degasser 2.

Figure 13:
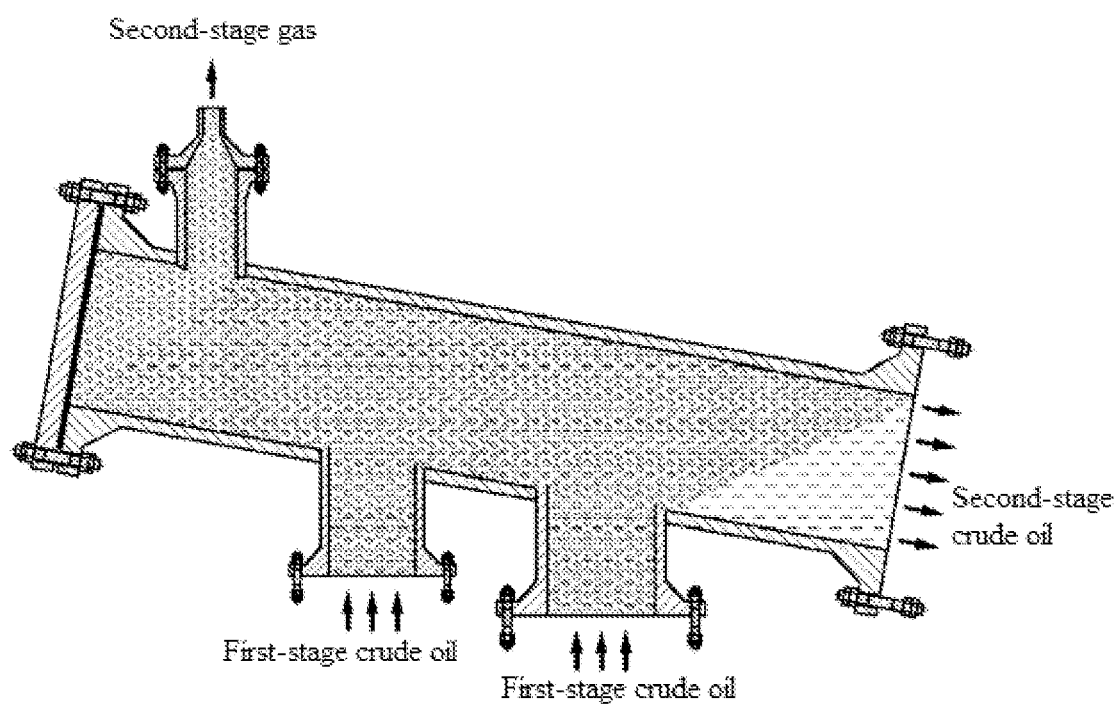
FIG. 13 is a schematic diagram of the second-stage elevated efficient degassing work flow in the three-stage degassing and dewatering device with tube network and rod electrode squirrel-cage formation.

In FIG. 13, the second-stage elevated efficient degassing operation of the three-stage degassing and dewatering device was as follows: the first-stage crude oil upon first-stage dewatering flowed into the upper liquid bleeding tube 10 and the upper liquid feeding tube 24 as well as the lower liquid bleeding tube 11 and the lower liquid feeding tube 23, respectively, and entered into the second-stage liquid feeding lumen 21 of the oblique degassing tube 25 for buffering. Large particles with a great specific weight in the first-stage crude oil within the second-stage degassing lumen 20 were floating upwards due to buoyancy, and were migrated along the tube wall of the second-stage degassing lumen 20 to the second-stage gas bleeding tube 26, and thereby were converged to a second-stage gas. At last, the second-stage gas was exhausted through the second-stage gas bleeding tube 26. The second-stage crude oil upon second-stage degassing was settled to the second-stage liquid bleeding lumen 22, and slipped along the tube wall of the oblique degassing tube 25 downwards to the flow mixing tube 50, and flowed into the dewaterer 5 subsequently.

Figure 14:
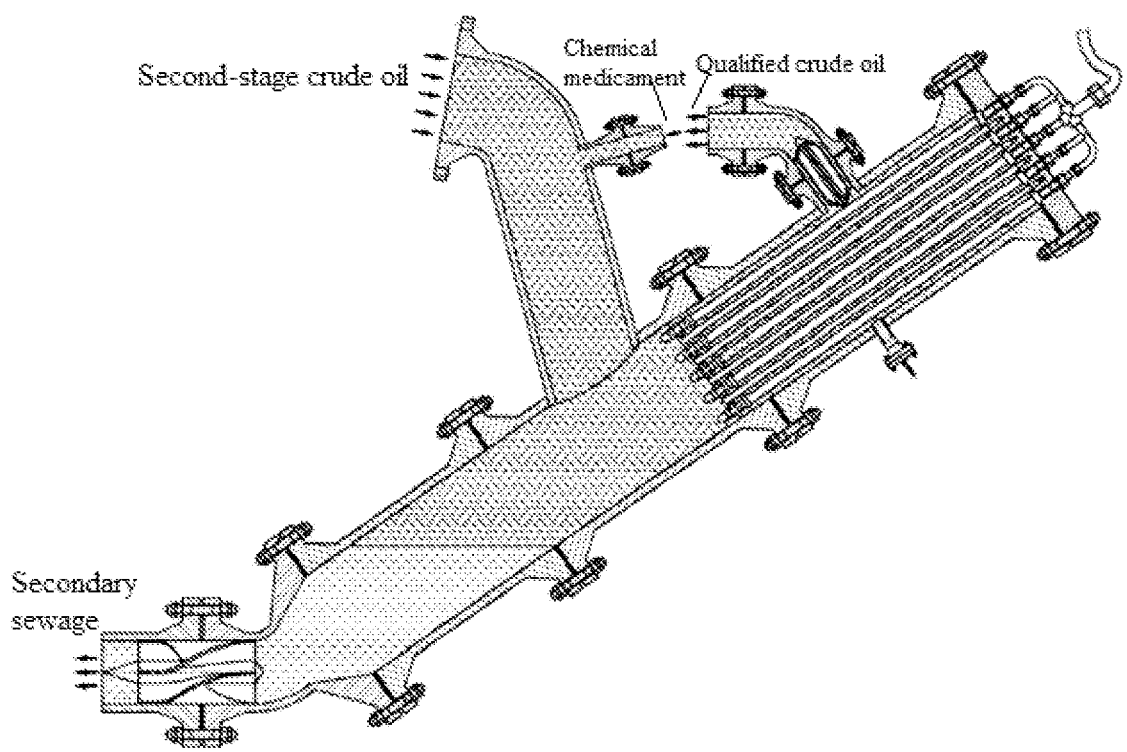
FIG. 14 is a schematic diagram of the work flow of the third-stage high-frequency and high-voltage rapid dewatering with a squirrel-cage formation in the three-stage degassing and dewatering device with tube network and rod electrode squirrel-cage formation.

In FIG. 14, the third-stage high-frequency and high-voltage rapid dewatering operation process of the three-stage degassing and dewatering device was as follows: after the flowing direction of the second-stage crude oil was adjusted through the inlet liquid bleeding tube section 51 and the crude oil reversing tube section 52, the second-stage crude oil and the chemical medicament inputted by the pharmaceutical tube 49 were fully mixed in the outlet flow mixing tube section 53, forming a crude oil emulsion. After entering into the emulsion buffer zone 57 for buffering, the crude oil emulsion flowed upwards into the electric dewatering zone 58 with a mouse case formation in the oblique electric dewatering tube 47. The oil-containing droplets of the crude oil emulsion in the high-frequency and high-voltage dynamic electric field constructed by the high-voltage insulating composite electrode 29 and the grounding bare electrode 30 were electrostatically coalesced in a dynamic manner, and enlarged rapidly, accordingly implementing high-frequency and high-voltage rapid electric dewatering treatment with a squirrel-cage formation. The oil phase was elevated to the upper part of the oblique electric dewatering tube 47, and formed a qualified crude oil. The qualified crude oil upon third-stage electric dewatering was discharged through the oil bleeding tube 48, was adjusted by respective flow stabilizing blades 62 on the flow stabilizing impeller 61 to a uniform flow, and then was discharged from the crude oil bleeding tube 59. At the same time, the water droplets in the electric dewatering zone 58 with a squirrel-cage formation were settled, and converged along the tube wall of the oblique liquid feeding tube 54 to the elevated settling zone 56 of the oblique settling tube 55, forming secondary sewage subsequently. The secondary sewage upon third-stage electric dewatering went through pressure adjustment and reversing via the pressure adjusting tube section 70, the water bleeding elbow tube section 69 and the flow stabilizing straight tube section 68 in turn, and after adjustment of the flowing direction thereof, was integrated to a stable flow. At last, the secondary sewage was discharged through the second-stage water bleeding tube 66.

The embodiments above were only used for explaining the present invention, and the structures, connection modes and so forth of parts therein may be changed. Equivalent changes and improvements made on the basis of the technical solutions in the present invention shall not be excluded from the scope of protection of the present invention.

The invention claimed is:

1. A three-stage degassing and dewatering device comprising: a first-stage degasser, a second-stage degasser, an oil drainer, a rod electrode, a dewaterer, and a water drainer; the first-stage degasser comprising an upper liquid bleeding tube and a lower liquid bleeding tube; the second-stage degasser comprising an upper liquid feeding tube and a lower liquid feeding tube; the dewaterer comprising a flow mixing tube; the rod electrode using a concentric loop, and constructing a dynamic electric field with a high frequency and a high voltage, comprising an electrode end cover, a high-voltage insulating composite electrode and a grounding bare electrode;

wherein the first-stage degasser and the second-stage degasser are connected to be a whole by means of the upper liquid bleeding tube and the lower liquid bleeding tube as well as the upper liquid feeding tube and the lower liquid feeding tube, and present an H-like type; the second-stage degasser is connected with the dewaterer by means of the flow mixing tube, and presents a Y-like type as a whole; the oil drainer and the water drainer are fixed on an upper end and a bottom end of the dewaterer, respectively, by means of a flange; the rod electrode is connected with the dewaterer by means of an electrode end cover; and the high-voltage insulating composite electrode and a grounding bare electrode are internally mounted in the dewaterer.

2. The three-stage degassing and dewatering device according to claim 1, characterizing in that the first-stage degasser further comprises a trapezoidal seam cone tube, a collision overflow plate, a column buffer tube, a first-stage water bleeding tube and a first-stage gas bleeding tube;

the trapezoidal seam cone tube uses a communicated tubule with a variable diameter, the trapezoidal seam cone tube and the column buffer tube are concentrically disposed, and the trapezoidal seam cone tube and the column buffer tube are fixed and connected; the trapezoidal seam cone tube consists of a first-stage straight tube section and a first-stage cone tube section, a tube wall of the first-stage cone tube section being provided with trapezoidal seams arranged uniformly along a circumferential direction, the collision overflow plate being fixed on a tube wall of the column buffer tube by means of circumferential welding, an upper steel plate of the collision overflow plate being drilled with uniformly arranged overflow apertures along the circumferential direction of the column buffer tube; the column buffer tube using a thin and long tube with both ends closed and being disposed obliquely; the column buffer tube being separated into a collision degassing lumen and a buffer dewatering lumen through the collision overflow plate, the first-stage gas bleeding tube being located in the middle of the collision degassing lumen, the upper liquid bleeding tube and the lower liquid bleeding tube being located on an upper part and a middle part of the buffer dewatering lumen, respectively, the first-stage water bleeding tube being located at the bottom of the column buffer tube.

3. The three-stage degassing and dewatering device according to claim 2, characterizing in that the second-stage degasser further comprises an oblique degassing tube and a second-stage gas bleeding tube;

the oblique degassing tube uses a thin and long tube with an upper end closed and is obliquely disposed; the oblique degassing tube is divided into a second-stage degassing lumen, a second-stage liquid feeding lumen and a second-stage liquid bleeding lumen from top to bottom, the second-stage gas bleeding tube being located on a top of the second-stage degassing lumen and vertically disposed upwards, the upper liquid feeding tube and the lower liquid feeding tube being located on both sides of the second-stage liquid feeding lumen of the oblique degassing tube and vertically disposed downward.

4. The three-stage degassing and dewatering device to claim 3, characterizing in that the rod electrode further comprises a terminal post and a separating loop plate;

respective branch manifolds of multi-branch round copper tubes of the terminal post are converged in a main round copper tube, and are connected with a high voltage cable; a high-voltage insulating composite electrode and a grounding bare electrode are arranged radially at equal intervals and in a layered manner, and are arranged concentrically in a staggered manner; the grounding bare electrode uses a bare long and round copper rod; the high-voltage insulating composite electrode is formed by combining a high-voltage electrode rod and an insulating coating; the high-voltage electrode rod uses a long and round copper rod and is coated with an insulating coating externally; the high-voltage electrode rod is connected with a terminal post by means of a non-metallic insulating nut; an upper part of the insulating coating is provided with a cone clamp, realizing axial positioning of the high-voltage insulating composite electrode; a top end of the cone clamp is configured with an insulating bushing which is embedded with a circular eyelet of an electrode end cover; a lower part of the insulating coating is provided with a cylindrical snap ring, realizing axial positioning of a high-voltage electrode loop plate; a bottom end of the insulating coating is provided with an electrode positioning end; one end of the grounding bare electrode is fitted with a threaded hole at each blind end of the electrode end cover, and the other end thereof is connected with the grounding electrode loop plate by means of interference fit; the electrode end cover serves as a motherboard for the high-voltage insulating composite electrode and the grounding bare electrode; the separating loop plate comprises a high-voltage electrode loop plate and a grounding electrode loop plate; the high-voltage loop plate and the grounding electrode loop plate each are concentrically arranged in a layered manner along the radial direction, and each are provided with high-voltage electrode round apertures and grounding electrode round apertures circumferentially and uniformly arranged; an annular passageway is formed between layers of the high-voltage electrode loop plate and the grounding electrode loop plate, and an arched aperture passageway is provided on each of a radially external circular surface and an internal circular surface.

5. The three-stage degassing and dewatering device according to claim 4, characterizing in that the dewaterer further comprises an oblique electric dewatering tube, an oblique liquid feeding tube, an oblique settling tube, a pharmaceutical tube and an oil bleeding tube;

the oblique electric dewatering tube, the oblique liquid feeding tube, and the oblique settling tube are disposed obliquely and concentrically from top to bottom, and are reversely and crosswise disposed with the oblique degassing tube; the oblique electric dewatering tube is provided internally with a high-voltage insulating composite electrode and a grounding bare electrode to form an electric dewatering zone; the oblique fluid feeding tube and the second-stage liquid bleeding lumen maintain communicating to form an emulsion buffer zone; the oblique settling tube and the water drainer maintain communicating to form an elevated settling zone; the flow mixing tube uses a thick and long elbow tube with equal diameters, and consists of an inlet liquid bleeding tube section, a crude oil reversing tube section, and an outlet flow mixing tube section; the pharmaceutical tube uses a thin and straight tube with equal diameters, and the oil bleeding tube uses a short and straight tube with equal diameters.

6. The three-stage degassing and dewatering device according to claim 5, characterizing in that the oil drainer comprises a crude oil bleeding tube, a flow stabilizing rod and a flow stabilizing impeller, the oil drainer being connected with the dewaterer to be a whole by means of the crude oil bleeding tube and the flange plate of the oil bleeding tube;

an inlet tube section of the crude oil bleeding tube is embedded with a flow stabilizing impeller and a flow stabilizing rod, and an outlet tube section of the crude oil bleeding tube is placed horizontally; the flow stabilizing impeller realizes axial fixation according to an interference fit; the flow stabilizing impeller consists of flow stabilizing blades uniformly disposed along an external circular surface of the flow stabilizing rod; a plate-sheet construction is used for the flow stabilizing blades, and conical surfaces are used for both end surfaces of the flow stabilizing rod.

7. The three-stage degassing and dewatering device according to claim 6, characterizing in that the water drainer comprises a second-stage water bleeding tube, a liquid feeding tube with a variable diameter, an anti-vortex rod and an anti-vortex impeller, the water drainer being connected with the dewaterer to be a whole by means of the liquid feeding tube with a variable diameter and the flange plate of the oblique settling tube;

the second-stage water bleeding tube and a flow stabilizing straight tube section of the liquid feeding tube with a variable diameter are disposed concentrically; the liquid feeding tube with a variable diameter uses an elbow tube with a variable cross-section, and is formed by combining a pressure adjusting tube section with a variable diameter, a water bleeding elbow tube section and the flow stabilizing straight tube section; the pressure adjusting tube section adjusts a flow pressure between the liquid feeding tube and the second-stage water bleeding tube; conical surfaces are used on both end surfaces of the anti-vortex rod; the anti-vortex impeller consists of anti-vortex blades uniformly disposed on an external circular surface of the anti-vortex rod, realizing axial fixation according to an interference fit; the anti-vortex blades use a helical blade construction, and screw pitches of helical lines where the contour lines are located are gradually increasing along the anti-vortex rod.

8. The three-stage degassing and dewatering device according to claim 7, characterizing in that the first-stage straight tube section of the trapezoidal seam cone tube serves as an inlet channel for a gas-containing and water-containing crude oil to enter into the first-stage degasser; trapezoidal seams of the trapezoidal seam cone tube maintain parallel to an axis of the trapezoidal seam cone tube along a lengthwise direction; the trapezoidal seams are internally thin and externally thick along a radial direction of the trapezoidal seam cone tube; some of the gas-containing and water-containing crude oil flows into the collision degassing lumen of the column buffer tube via the trapezoidal seams of the trapezoidal seam cone tube;

the collision degassing lumen of the column buffer tube maintains communicating with the trapezoidal seam cone tube and the first-stage gas bleeding tube, respectively; the buffer dewatering lumen of the column buffer tube maintains communicating with the upper liquid bleeding tube, the lower liquid bleeding tube and the first-stage water bleeding tube.

9. The three-stage degassing and dewatering device according to claim 7, characterizing in that the collision overflow plate of the first-stage degasser uses an arched curved steel plate; an upper steel pate of the collision overflow plate radially presents a sector along the column buffer tube, and a lower steel plate axially presents a semicircular shape; annular passageways are used for overflow apertures on the collision overflow plate; a round face of a big end of the first-stage cone tube section of the trapezoidal seam cone tube has a radius smaller than a height of the upper steel plate of the collision overflow plate along a radial direction of the column buffer tube.

10. The three-stage degassing and dewatering device according to claim 7, characterizing in that the second-stage water bleeding tube uses a thin and straight tube with an equal diameter, and is internally provided with an anti-vortex rod and one side of the anti-vortex impeller; conical surfaces are used on inner and outer tube walls of the pressure adjusting tube section of the liquid feeding tube; the flow stabilizing straight tube section is disposed horizontally and is internally embedded with an anti-vortex rod and the other side of the anti-vortex impeller; a thin and short rod is used for the anti-vortex rod; the anti-vortex blades realize fixation between the anti-vortex impeller and the anti-vortex rod by means of welding radially along an inner side of the anti-vortex rod; an interference fit is used between a cylindrical surface where the anti-vortex impeller along a radial external circular surface of the anti-vortex rod is located and a tube wall of the flow stabilizing straight tube section, and an interference fit is used between a cylindrical surface where an outer circular surface of the anti-vortex impeller is located and a tube wall of the second-stage water bleeding tube section; the contour lines of the anti-vortex blades are spiral lines unfolded along the external circular surface of the anti-vortex rod, and the tangent lines at both endpoints of a spiral line where a contour line of the anti-vortex blades is located maintain parallel to an axis of the anti-vortex rod.

* * * * *